United States Patent
Lecuelle

(10) Patent No.: US 9,064,141 B2
(45) Date of Patent: Jun. 23, 2015

(54) METHOD AND DEVICE FOR AUTOMATICALLY DETERMINING THE RIDGE LINES OF A VARIABLE-HEIGHT AREA

(75) Inventor: Jérémy Lecuelle, Chatenay-Malabry (FR)

(73) Assignee: MBDA FRANCE, Paris (FR)

( * ) Notice: Subject to any disclaimer, the term of this patent is extended or adjusted under 35 U.S.C. 154(b) by 0 days.

(21) Appl. No.: 14/124,103

(22) PCT Filed: Jun. 1, 2012

(86) PCT No.: PCT/FR2012/000222
§ 371 (c)(1),
(2), (4) Date: Jan. 29, 2014

(87) PCT Pub. No.: WO2012/168571
PCT Pub. Date: Dec. 13, 2012

(65) Prior Publication Data
US 2014/0185936 A1    Jul. 3, 2014

(30) Foreign Application Priority Data
Jun. 9, 2011    (FR) ...................... 11 01772

(51) Int. Cl.
| G06K 9/00 | (2006.01) |
| G06T 7/00 | (2006.01) |
| G06T 17/05 | (2011.01) |
| G06K 9/46 | (2006.01) |

(52) U.S. Cl.
CPC ............ *G06K 9/0008* (2013.01); *G06T 7/0085* (2013.01); *G06T 17/05* (2013.01); *G06T 2207/10028* (2013.01); *G06T 2207/10032* (2013.01); *G06T 2207/20044* (2013.01); *G06T 2207/20136* (2013.01); *G06T 2207/20152* (2013.01); *G06T 2207/30181* (2013.01); *G06K 9/4604* (2013.01)

(58) Field of Classification Search
CPC . G06K 9/0008; G06K 9/001; G06K 9/00409; G06K 9/00416; G06T 7/0083; G06T 7/0085
See application file for complete search history.

(56) References Cited

U.S. PATENT DOCUMENTS

| 4,680,803 | A | * | 7/1987 | Dilella | ........................ | 382/140 |
| 5,420,937 | A | * | 5/1995 | Davis | ........................ | 382/125 |

(Continued)

OTHER PUBLICATIONS

Weibel. R., Heller, M: "Digital Terrain Modeling". Geographical Information Systems: Principles and Applications, London, 1991, pp. 269-297.

(Continued)

*Primary Examiner* — Manav Seth
(74) *Attorney, Agent, or Firm* — Duane Morris LLP; J. Rodman Steele, Jr.; Gregory M. Lefkowitz

(57) ABSTRACT

The invention relates to a device (1) comprising: means (3) for receiving an image of a pre-determined area, containing the heights of points therein; means (8) for determining the directions of flow; means (9) for finding source points that can be used to create a binary image; means (11) for filtering the binary image; processing means (13) that can be used to obtain a set of lines formed by source points; means (15) for creating, from said set of lines, a set of sequences of segments illustrating the ridge lines of the area; and means (19) for transmitting said set of sequences of segments to user means (22).

10 Claims, 2 Drawing Sheets

(56) References Cited

U.S. PATENT DOCUMENTS

| | | | | |
|---|---|---|---|---|
| 5,616,905 | A * | 4/1997 | Sugiyama | 235/456 |
| 5,631,971 | A * | 5/1997 | Sparrow | 382/125 |
| 5,953,443 | A * | 9/1999 | Hiratsuka et al. | 340/5.83 |
| 6,263,091 | B1 * | 7/2001 | Jain et al. | 382/125 |
| 6,289,112 | B1 * | 9/2001 | Jain et al. | 382/116 |
| 7,916,957 | B2 * | 3/2011 | Hara | 382/237 |
| 8,811,692 | B2 * | 8/2014 | Prokoski | 382/128 |
| 2002/0150283 | A1 * | 10/2002 | Mimura et al. | 382/124 |
| 2004/0125993 | A1 * | 7/2004 | Zhao et al. | 382/124 |
| 2005/0013477 | A1 * | 1/2005 | Ratti et al. | 382/154 |
| 2008/0238613 | A1 * | 10/2008 | Salva Calcagno | 340/5.83 |

OTHER PUBLICATIONS

Viviana Mascardi:"Extraction of Significant Terrain Features from RSG and TIN: A Survey". Dipartimento di Informatica e Scienze dell'Informazion—Technical Reports of Viviana Mascardi. Dec. 19, 1998, pp. 1-24.

O'Callaghan J F et al: "The extraction of drainage networks from digital elevation data". Computer Vision, Graphics, and Image Processing USA, vol. 28, No. 3, Dec. 1984, pp. 323-344.

Kate Beard: "Digital Terrain Model", Spatial Information Science and Engineering—Kate Beard Lecture SIE 510 GIS Applications Jan. 17, 2011, pp. 1-13.

Johan De Bock et al: "A Fast Sequential Rainfalling Watershed Segmentation Algorithm", Jan. 1, 2005, Advanced Concepts for Intelligent Vision Systems Lecture Notes in Computer Science;;LNCS, Springer, Berlin, DE, pp. 476-482.

Seemuller W W: "The Extraction of Ordered Vector Drainage Networks From Elevation Data",Computer Vision Graphics and Image Processing, Academic Press, Duluth, MA,US, vol . 47, No. 1, Jul. 1, 1989, pp. 45-58.

Martz L W et al: "Numerical definition of drainage network and subcatchment areas from digital elevation models", Computers & Geosciences UK, vol. 18, No. 6, Jul. 1992, pp. 747-761.

* cited by examiner

METHOD AND DEVICE FOR AUTOMATICALLY DETERMINING THE RIDGE LINES OF A VARIABLE-HEIGHT AREA

CROSS-REFERENCE TO RELATED APPLICATIONS

This application is a §371 national stage entry of International Application No. PCT/FR2012/000222, filed Jun. 1, 2012, which claims priority to French Patent Application No. 1101772 filed Jun. 9, 2011, the entire contents of which are incorporated herein by reference.

FIELD OF THE INVENTION

The present invention relates to a method and a device for automatically determining ridge lines of a variable-height area, in particular of a geographical area.

BACKGROUND

It is known that knowledge of the ridge lines of the relief of a particular geographical area is, in particular, very useful for rapid understanding of the limits of the inter-visibility areas in relation to an observation point on the ground, in flight or under water.

These data make it possible in particular for military personnel or mobile law enforcement agencies to know the progression spaces in which they can remain hidden from a potential enemy situated beyond.

Such ridge lines may, in particular, be used by mobile ground, air or submarine elements with automatic adaptation of the extraction of the ridge lines according to the altitude and the current position of these mobile elements.

This concept of ridge lines (in relation to a variable-height area) can also be used by analogy in the medical field, in particular in the study of the cerebral cortex, for which pseudo ridge lines of the brain can be considered to serve as starting points for defining functional areas.

To determine such ridge lines, a method implementing an extraction by analysis of the curvatures of a triangulated area is known.

However, this conventional method requires the availability of a triangulated area, and this makes it necessary to pre-process the altimetric data (available in matrix form or in raster form).

This conventional method is thus unsatisfactory.

Furthermore, a method and a device for automatically determining the contour of valleys of a geographical area are known from EP 0 863 487.

BRIEF SUMMARY OF THE INVENTION

The object of the present invention is to overcome the above-mentioned drawbacks. It relates to a method for determining, in a rapid, simple and reliable manner and at reduced cost, the ridge lines of the relief of a particular variable-height area, in particular of a geographical area.

To this end, according to the invention said method is noteworthy in that the following successive operations are performed automatically:
a) on the basis of an image of said area, which contains the heights of points therein, flow directions are determined;
b) on the basis of said flow directions, source points which make it possible to create a binary image are sought, a source point being a point towards which no point in its vicinity leads along said flow directions;
c) said binary image is filtered to eliminate isolated points so as to obtain elements formed of adjacent source points;
d) the elements thus obtained are processed so as to obtain a set of lines formed of source points; and
e) on the basis of said set of lines, a set of sequences of segments illustrating the ridge lines of said area is created.

Thus, owing to the invention, it is possible to determine automatically, in a rapid, simple and reliable manner and at reduced cost, the ridge lines of the relief of a particular variable-height area, in particular of a geographical area.

The method according to the invention thus makes it possible to extract from a digitised image of said area under consideration, this image being for example from a conventional DTED (Digital Terrain Elevation Data) file in the case of a terrestrial geographical area, the ridge lines of the relief, irrespective of the observation point, and to present these ridge lines in the form of a set of sequences of segments, a sequence of segments representing a line formed of a series of line segments. Such a representation in the form of a set of sequences of segments can advantageously be used in the context of a military operation or in the context of a civil operation.

In a preferred embodiment, in step e) said set of sequences of segments is superimposed on an image of the area under consideration so as to obtain a composite image, which can in particular be displayed or printed.

Furthermore, advantageously:
  in step c) at least 3×3 median filtering is performed; and
  in step d) a skeletisation method is implemented to reduce said elements to a set of lines, centred on these elements and having a thickness of one pixel.

In addition, the following successive operations are advantageously performed in step e):
  pre-processing is carried out to prepare the data received from step d) for extraction;
  ridge lines are extracted; and
  final processing is carried out to eliminate duplicates and preserve only the segments which are longer than an adjustable threshold length.

The method according to the invention can be used for any type of terrestrial relief. It can also be used for any type of submarine relief (submarine operation) and for any type of non-terrestrial planetary relief (space exploration). Finally, said method according to the invention can also be used in the medical field. The concept of ridge lines (in relation to a variable-height area) can be used by analogy in the medical field, in particular in the study of the cerebral cortex, where ridge lines of the brain serve as starting points for defining the different functional areas thereof.

The present invention also relates to a device for automatically determining (in a rapid, simple and reliable manner and at reduced cost) the ridge lines of the relief of a particular variable-height area.

To this end, according to the invention said device is noteworthy in that it comprises:
  means for receiving an image of said area, which contains the heights of points therein;
  means for determining flow directions on the basis of said image;
  means for searching, on the basis of said flow directions, for source points which make it possible to create a binary image, a source point being a point towards which no point in its vicinity leads along said flow directions;

means for filtering said binary image in order to eliminate isolated points so as to obtain elements formed of adjacent source points;

means for processing the elements thus obtained so as to obtain a set of lines formed of source points;

means for creating, on the basis of said set of lines, a set of sequences of segments illustrating the ridge lines of said area; and means for transmitting said set of sequences of segments to user means, for example display or printing means.

In a particular embodiment, said device also comprises:

means for superimposing said set of sequences of segments consistently on an image of said geographical area so as to obtain a composite image;

means allowing an operator to enter data, and in particular adjustment parameters which make it possible to vary the dimensional features of the ridge lines extracted from the geographical area analysed; and/or said user means.

Thus, said device makes it possible in particular to determine rapidly, in the form of sequences of segments, the ridge lines of the relief of a determined area, irrespective of the observation point. The ridge lines may represent strategic elements in diverse situations, for example during deployment of weapons systems, the layout of the ridge lines making it possible to position these weapons systems optimally, or during placement of troops, the ridge lines being the limits of the inter-visibility fields. By analogy, said device also makes it possible to extract pseudo ridge lines for various applications, in particular in the medical field.

The figures of the appended drawings will facilitate understanding of how the invention can be implemented. In these figures, identical references designate similar elements.

DETAILED DESCRIPTION OF THE INVENTION

Figure 1:
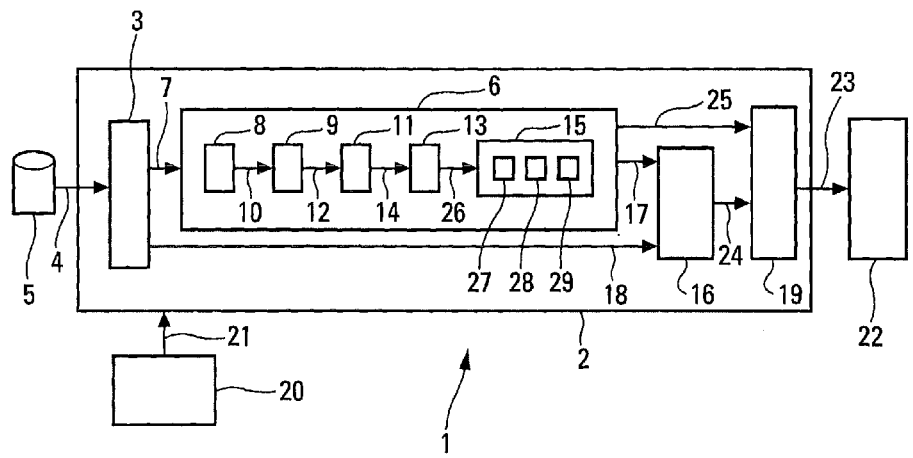
FIG. 1 is a block diagram of a device according to the invention.

The device 1 according to the invention and shown schematically in FIG. 1 is suitable for automatically determining (in a rapid, simple and reliable manner and at reduced cost) the ridge lines of the relief of a particular variable-height area ZO, and in particular of a particular geographical area.

For this purpose, said device 1 comprises, according to the invention, a processing unit 2 which comprises:

data acquisition means 3, for receiving an image of the (for example geographical) area ZO to be analysed. This image is a digitised image and contains the heights of points in this area ZO. This image may contain for example altimetric data of points in a geographical area. It is received (via a data transmission link 4) from a file, preferably a DTED (Digital Terrain Elevation Data) file, which is stored in a conventional database 5; and image processing means 6, which are connected to said means 3 by a link 7.

According to the invention, said means 6 comprise:

means 8 for determining flow directions 30 on the basis of the received image;

means 9 which are connected via a link 10 to said means 8 and which are formed to search, on the basis of said flow directions 30, for source points which make it possible to create a binary image I2, a source point being a point towards which no point in its vicinity leads along said flow directions 30;

means 11 which are connected via a link 12 to said means 9 and which are formed to filter said binary image I2 to eliminate isolated points in order to obtain elements 31 formed of adjacent source points;

means 13 which are connected via a link 14 to said means 11 and which are formed to process the elements 31 thus obtained in order to obtain a set of lines 32 formed of source points; and means 15 which are connected via a link 26 to said means 13 and which are formed to create, on the basis of said set of lines 32, a set of sequences of segments Si illustrating the ridge lines of said area ZO.

In addition, said processing unit 2 further comprises means 16 which are for example connected via links 17 and 18 to said means 6 and 3 respectively and which are formed to superimpose said set of sequences of segments Si (received from the means 6) on an image F of said geographical area (received from the means 3), for example a photo taken by a satellite. This superimposition is performed consistently, that is to say that information relating to the same coordinates in the plane of the image is superimposed each time. What is known as a composite (or hybrid) image IF is thus obtained, such as that shown for example in FIG. 6, which can be transmitted via information transmission means 19.

In addition, said device 1 further comprises:

means 20, for example a keyboard or any other data capture means, which are for example connected via a link 21 to said processing unit 2 and which are formed to allow an operator to enter data into said processing unit 2, and in particular what are known as adjustment parameters, defined below; and user means 22, in particular display or printing means, which make it possible to present to an operator the results of the processing implemented by the processing unit 2 (and received via a link 23 from said means 19). Said means 19 of the unit 2 are connected via links 24 and 25 to said means 16 and 6 respectively.

Thus, the device 1 according to the invention is capable of automatically determining (in a rapid, simple and reliable manner and at reduced cost) the ridge lines of the relief of a particular variable-height area ZO, in particular of a particular geographical area.

Said device 1 thus makes it possible to extract ridge lines of the relief from a digitised image of said area under consideration, this image being for example from a conventional DTED (Digital Terrain Elevation Data) file in the case of a terrestrial geographical area, irrespective of the observation point, and to present the ridge lines in the form of a set of sequences of segments Si. In the context of the present invention, any sequence Si of segments represents a line which is formed of a series of line segments. Such a representation in the form of a set of sequences of segments Si can advantageously be used in the context of a military operation or in the context of a civil operation.

As specified below, said device 1 uses adjustment parameters which can be adjusted, that is to say modified, by an operator using the means 20, and which make it possible to vary the dimensional features of the ridge lines extracted from the area ZO analysed, and this means that the invention can be used for any type of terrestrial relief. The device 1 can also be used for any type of submarine relief (submarine operation)

and for any type of non-terrestrial planetary relief (space exploration). It can also be used in the medical field, in particular in the study of the cerebral cortex, where ridge lines of the brain make it possible to define its different functional areas.

It will be noted that the extraction implemented by the present invention is based on the following observation: the ridge lines are formed for the most part by points which are sources of the hydrographical network. However, the source points do not all systematically belong to a ridge line, hence the need for filtering. The search for ridge lines is separated into two main steps: extraction of the source points and exploitation of these source points which leads to the formation of the ridge lines. The first step of the processing uses techniques similar to those used in the extraction of water courses, while the second step uses image processing methods.

In order to be able to determine the source points, that is to say the points towards which no point in the vicinity leads, the means 8 must define a flow direction for each point in the image of the relief. The algorithm used is the same as that which is conventionally used when defining the simple directions when extracting water courses. A value (of between 1 and 8) is thus associated with each point in the image of the heights (or altitudes), which value indicates towards which of its neighbours the flow is directed. Virtual rain is thus simulated on the digitised altimetric data file of the (geographical) area in question and the flow of this virtual rain is calculated, which makes it possible to obtain the flow directions for each point in the area under consideration and to construct lines 30 representing pseudo water courses, as shown in FIG. 2, which is a plan view of the image I1 resulting from the processing implemented by the means 8.

Figures 2, 3:
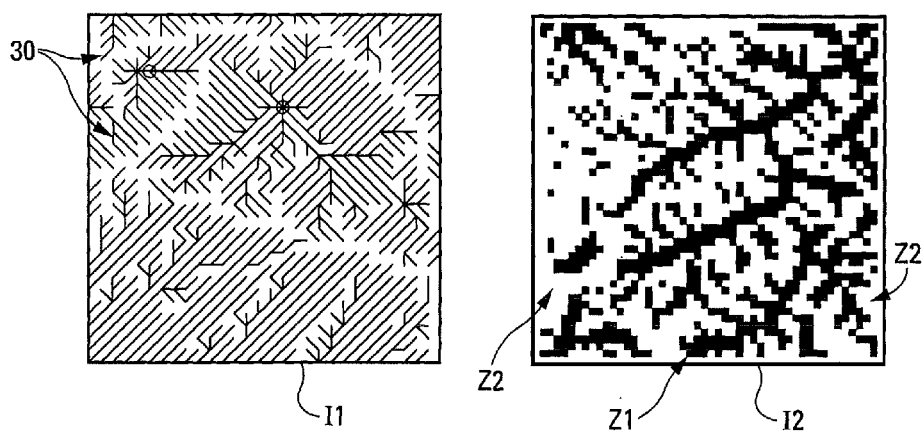
FIGS. 2 to 5 show schematically images obtained at the end of different successive steps during implementation of the method according to the invention.

The means 9 then search for the source points, that is to say the points towards which no point in the vicinity leads, by following the flow directions 30 in FIG. 2. Said means 9 construct a binary image I2, as shown in FIG. 3. This binary image comprises two types of area Z1 and Z2 (illustrated respectively in black and white), namely areas Z1 representing the source points and areas Z2 representing the points which are not source points.

Figure 4:

It is necessary to filter this binary image I2 at the source points thus determined (areas Z1). This processing implemented by the means 11 is 3×3 median filtering. The purpose of filtering the image of the source points is to eliminate the isolated points. Forms 31 made up of contiguous source points are thus obtained, as shown in the filtered image I3 of the source points, shown in FIG. 4.

Depending on the requirements for the ridge lines, it is conceivable to repeat this filtering process multiple times. An adjustment parameter allows an operator to define (using the means 20) the number of times that the image will be filtered.

Figure 5:
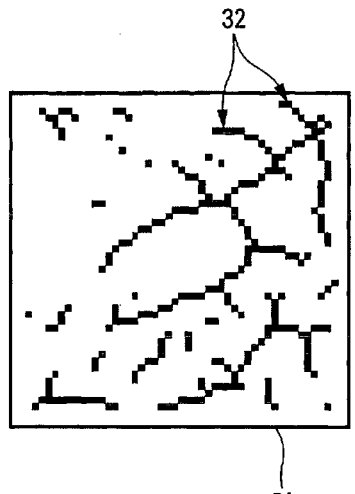

Then the means 13 process the elements 31 thus obtained, so as to obtain a set of lines 32 formed of contiguous source points. To make the ridge lines appear in the filtered image of the source points, the means 13 use a skeletisation method which makes it possible to reduce the forms present in the image to a set of curves 32 having a thickness of one pixel, centred on the original forms. The result obtained (image I4) is shown in FIG. 5.

Furthermore, said means 15 which are intended ultimately to create the set of sequences of segments Si comprise:
an element 27 for carrying out pre-processing so as to prepare the data received from the means 13 for extraction;
an element 28 for extracting ridge lines; and
an element 29 for carrying out subsequent processing in order to eliminate duplicates and preserve only the segments which are longer than an adjustable threshold length.

The purpose of the pre-processing of the image implemented by the element 27 is to prepare the image for the algorithm for extracting the ridge lines. Its aim is to modify the image in order to be able to identify easily the ends and the points of confluence of the ridge lines. The value of a pixel of a ridge line is replaced by the value of the vicinity which corresponds to the number of neighbours which belong to a ridge line.

This processing is performed in the following manner:
the input image of the ridges is a binary image where 0 is associated with the ridge lines and 255 with the other pixels;
a first modification of the format makes it possible to obtain a binary image where 1 is associated with the ridge lines and 0 with the rest of the image. The value of the pixels can then be replaced by the value of the vicinity by using a convolution;
a second modification of the format is an inversion which makes it possible to obtain a binary image where 255 is associated with the ridge lines and 0 with the rest of the image. The image thus obtained can then be used as a mask to keep the result of the convolution only on the ridge lines. This processing is performed by an AND logic gate between the two images.

In the image obtained (not shown), the points of confluence of the ridge lines are the pixels having a value strictly greater than 2, and the ends are those having a value of 1.

Furthermore, the element 28 implements a first step that consists of obtaining the positions of the local maxima in the image. The points on the basis of which the ridge lines will be extracted are thus obtained. These starting points are generally points of confluence (when the value of the pixel is strictly greater than 2) or points inside isolated ridge lines (when the pixel has a value of 1 or 2).

The extraction algorithm is as follows:
a starting point is selected. The value of the pixel indicates the number of ridge lines departing from this point;
proceeding step by step, starting from the points adjacent to this starting point, the ridge lines are scanned, the coordinates encountered being stored, until a point of confluence or an end is reached.

The extraction algorithm produces a result which comprises duplicates. This is because a ridge line which is a junction between two points of confluence is extracted twice.

The subsequent processing implemented by the element 29 consists of eliminating these duplicates by comparing the ends of the ridge lines.

The processing implemented by the element 29 also makes it possible to filter the ridge lines to keep only those which are of a sufficient length, that is to say a length greater than a minimum length. This minimum length is an adjustment parameter which can be modified by an operator (using the means 20).

Figure 6:
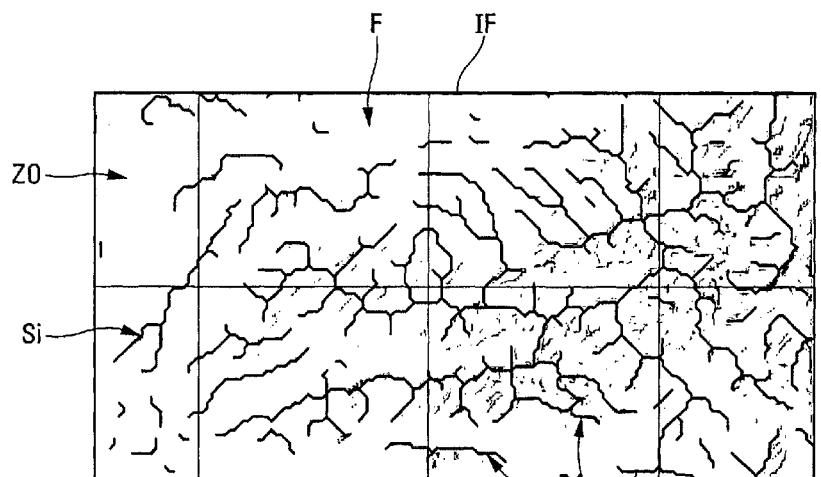
FIG. 6 shows schematically a composite image which can be obtained by means of a device according to the invention.

FIG. 6 shows a composite image IF comprising a background F illustrating an image (for example a satellite image) on which the ridge lines have been superimposed, that is to say the set of sequences Si of segments, obtained by means of the invention.

The invention claimed is:
1. Method for automatically determining ridge lines of a particular variable-height area, according to which method the following successive operations are performed automatically:

a) on the basis of an image of said area (ZO), which contains the heights of points therein, flow directions (30) are determined;
b) on the basis of said flow directions (30), source points which make it possible to create a binary image (I2) are sought, a source point being a point towards which no point in its vicinity leads along said flow directions (30);
c) said binary image (I2) is filtered to eliminate isolated points so as to obtain elements (31) formed of adjacent source points;
d) the elements (31) thus obtained are processed so as to obtain a set of lines (32) formed of source points; and
e) on the basis of said set of lines (32), a set of sequences of segments (Si) illustrating the ridge lines of said area (ZO) is created, by performing the following successive operations:
pre-processing is carried out to prepare the data received from step d) for extraction;
ridge lines are extracted; and
final processing is carried out to eliminate duplicates and preserve only the segments which are longer than an adjustable threshold length.

2. Method according to claim 1, wherein in step c) at least 3×3 median filtering is implemented.

3. Method according to claim 1, wherein in step d) a skeletisation method is implemented to reduce said elements (31) to a set of lines (32), centred on these elements and having a thickness of one pixel.

4. Method according to claim 1, wherein in step e) said set of sequences of segments (Si) is superimposed on an image (F) of said area (ZO) so as to obtain a composite image (IF).

5. Method according to claim 1, wherein said particular area is a geographical area.

6. Method according to claim 1, wherein said particular area is a portion of a cerebral cortex.

7. Device for automatically determining ridge lines of a particular variable-height area, said device (1) comprising:

means (3) for receiving an image of said area (ZO), which contains the heights of points therein;
means (8) for determining flow directions (30) on the basis of said image;
means (9) for searching, on the basis of said flow directions (30), for source points which make it possible to create a binary image (I2), a source point being a point towards which no point in its vicinity leads along said flow directions (30);
means (11) for filtering said binary image (I2) in order to eliminate isolated points so as to obtain elements (31) formed of adjacent source points;
means (13) for processing the elements (31) thus obtained so as to obtain a set of lines (32) formed of source points;
means (15) for creating, on the basis of said set of lines, a set of sequences of segments (Si) illustrating the ridge lines of said area (ZO), said means (15) comprising:
an element (27) for carrying out pre-processing so as to prepare the data received from the means (13) for extraction;
an element (28) for extracting ridge lines; and
an element (29) for carrying out subsequent processing in order to eliminate duplicates and preserve only the segments which are longer than an adjustable threshold length; and
means (19) for transmitting said set of sequences of segments to user means (22).

8. Device according to claim 7, wherein it further comprises means (16) for superimposing said set of sequences of segments (Si) consistently on an image (F) of said geographical area (ZO) so as to obtain a composite image (IF).

9. Device according to claim 7, wherein it further comprises means (20) allowing an operator to enter data into said device (1).

10. Device according to claim 7, wherein it further comprises said user means (22).

* * * * *